United States Patent [19]

Goodzey

[11] Patent Number: 4,722,094
[45] Date of Patent: Jan. 26, 1988

[54] DIGITAL RATE DETECTION CIRCUIT

[75] Inventor: Gregory P. Goodzey, Mishawaka, Ind.

[73] Assignee: Allied Corporation, Morristown, N.J.

[21] Appl. No.: 809,378

[22] Filed: Dec. 16, 1985

[51] Int. Cl.$^4$ .................. H03K 21/00; H03K 23/00
[52] U.S. Cl. ........................................ 377/23; 377/45; 324/162; 364/426; 364/566
[58] Field of Search .................. 377/23, 45; 364/426, 364/566; 73/503, 506, 514; 324/162; 307/519; 340/669

[56] References Cited

U.S. PATENT DOCUMENTS

| 3,731,301 | 5/1973 | Davis | 324/162 |
| 4,070,562 | 1/1978 | Kuno et al. | 377/23 |
| 4,341,996 | 7/1982 | Coffman | 364/566 |
| 4,408,290 | 10/1983 | Kubo et al. | 364/566 |

FOREIGN PATENT DOCUMENTS 19585 2/1977 Japan .................. 324/162

Primary Examiner—Stanley D. Miller
Assistant Examiner—K. Ohralik
Attorney, Agent, or Firm—Ronald D. Welch; Ken C. Decker

[57] ABSTRACT

A device for measuring the rate of change of speed of a machine such as a turbine engine which includes a digital counter for counting a speed signal having a frequency proportional to engine speed for a predetermined period of time and decrementing said count for a second period of time with the counting periods being proportional to engine speed. The up and down counts are derived by dividing a fixed frequency clock signal by a number proportional to engine speed to generate a variable frequency signal which frequency is proportional to engine speed. The difference between the up and down counts generates a remainder signal which is compared to predetermined limits.

10 Claims, 4 Drawing Figures

DIGITAL RATE DETECTION CIRCUIT

The present invention relates to devices for measuring the speed of an engine and more particularly to a digital circuit which will detect the rate of change of speed of a device and generate a control signal when the rate of change of speed (acceleration) exceeds predetermined limits, the device having particular application to machines such as gas turbine engines.

Circuits which detect over-acceleration of machines and in particular such machines as turbine engines are widely used. In one such type of circuit, analogue techniques are used. A signal from a magnetic pick-up is conditioned, filtered, and squared to produce a train of logic level pulses. A frequency to voltage converter produces from this signal an analogue signal proportional to the frequency of the output from the magnetic pick-up. From this signal, an operational amplifier-differentiator produces a voltage proportional to the change of the velocity with respect to time. The voltage is compared to a reference voltage representing a maximum allowable rate of change of speed, to produce an alarm or control signal in the event of an "out-of-spec" condition. This method, while straightforward, is subject to the common weaknesses of an analogue circuit. For example, such a circuit depends for its accuracy upon the accuracy of the components used. The differentiating circuit is sensitive to high frequency noise and phase shift delays, and components are subject to drift caused by age, temperature, and loss of accuracy.

A prior art digital method for detecting acceleration has also been used. In this method a Z-plane transfer function is obtained by a transformation of the frequency response of a differentiator. This method requires complex digital iteration operations and thereby uses more circuitry and has slowed response time due to computational delays.

Broadly, the present invention is an overacceleration detecting circuit which utilizes a digital period measuring technique instead of a frequency response technique to produce an acceleration detection device having substantially percent of point accuracy. The system comprises a pulse generating circuit which generates a signal having a frequency proportional to machine speed and a clock signal generating circuit for generating a clock signal of predetermined fixed frequency. A timing circuit is connected to receive the speed signal and the clock signal and generates a sequential series of timing control signals. The timing control signals are subsequently used to control counting of a clock signal to establish a speed signal multiplier and to control an up/down counter wherein the speed signals are counted "up" for a period determined by the timing signals and then counted "down" in the same manner. A comparator circuit compares the remainder of the "up" and "down" counts to predetermined limits and produces an over acceleration signal if the difference exceeds predetermined limits.

In a specific embodiment of the invention, the speed multiplier is generated from a clock signal having a fixed frequency the cycles of which are counted for a period of time determined by the time required for the speed signal, a variable pulse rate signal, to accumulate a predetermined count.

It is therefore an object of the invention to provide an improved digital acceleration detector.

Another object of the invention is to provide such a circuit utilizing an up/down counting technique.

Yet another object to the invention is to provide such a circuit in which the up and down counting is dependent upon engine speed to provide an acceleration detector which has substantially per cent of point accuracy.

These and other objects of the invention will be more clearly understood which taken in conjunction with the attached drawings wherein.

DESCRIPTION OF THE PREFERRED EMOBIDMENT

Figure 1:
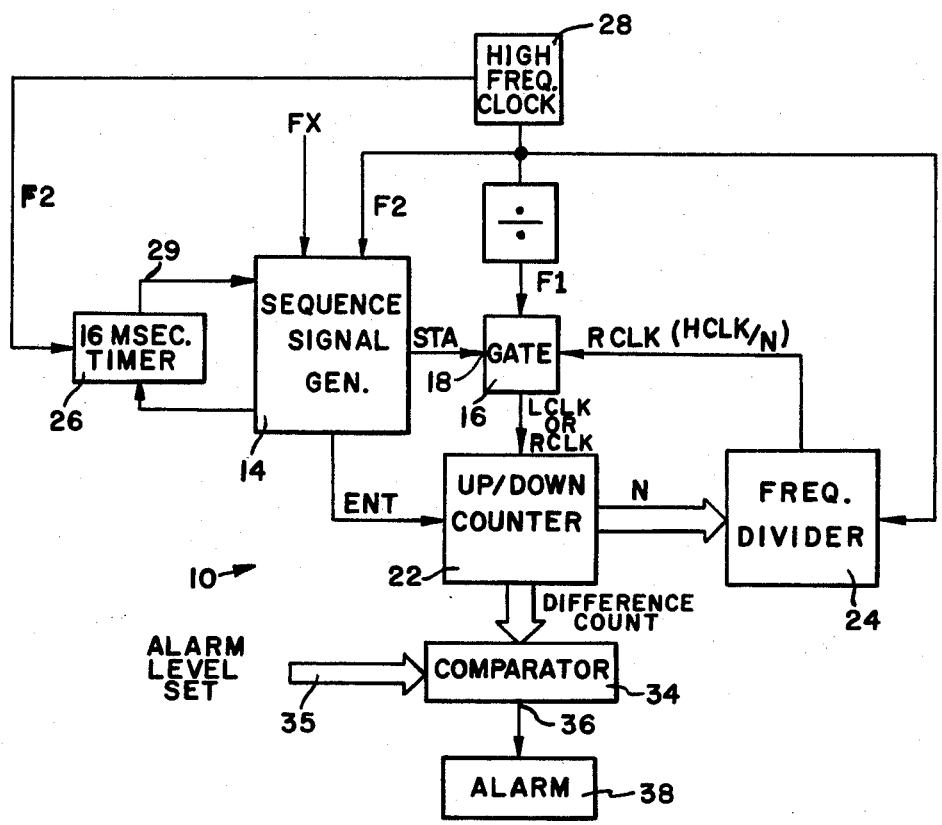
FIG. 1 is a block diagram of a digital rate detector circuit in accordance with the present invention.

Referring now to the drawings, there is shown in FIG. 1 a block diagram of a digital rate detector circuit 10. The circuit is connected to a speed pulse generator (not shown) which is mounted to a machine such as a turbine engine and which generates a speed pulse signal FX having a frequency directly proportional to the speed of the machine.

Figure 2:
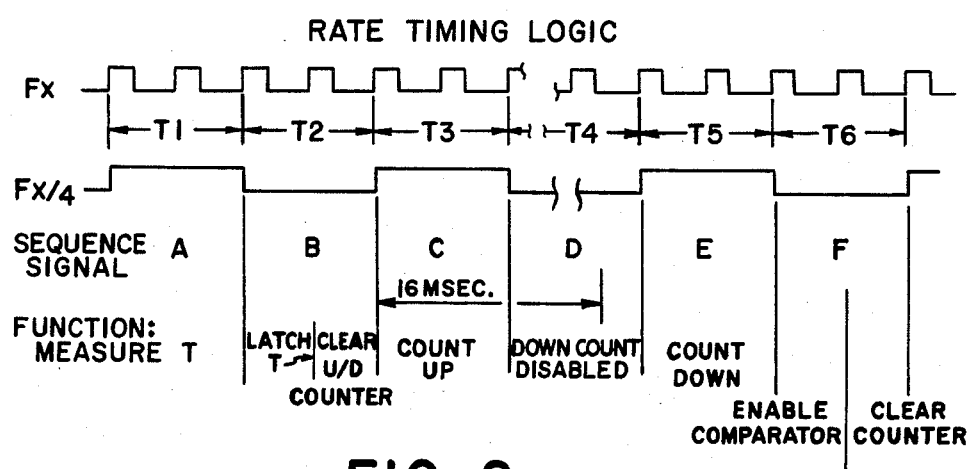
FIG. 2 is a chart showing important timing relationships of the circuit.

The speed pulse signal FX is applied to a sequence signal generator circuit 14. Circuit 14 is basically a ring counter which, in response to the speed signal FX, generates a series of sequence control signals A through F (FIG. 2). The period of these signals A–F will thus depend upon the frequency of the speed signal FX. The first of these control signals "A" is applied to input terminal 18 of an input gate 16. Signal A is used to gate a fixed frequency clock signal F1 to the input of an up/down divider counter 22. The counter 22 will count the number of F1 pulses which occur during the time period T1 of sequence signal A to generate a number N which has a value F1 *T1. Under the control of circuit 14 this number "N" is shifted into a digital frequency divider circuit 24 and stored, this occurring during the second time period B. During this interval the counter 22 is also cleared.

Clock signal F2 being applied to frequency divider 24 is divided by the value of N derived from signal F1 and sequence signal A of time period T1 inversely proportional to engine speed. The result of this computation is a signal designated RCLK having a value F2/N. Since F2 is constant and N is inversely proportional to machine speed, the value of RCLK will be proportional to machine speed.

Next in sequence, during time interval C, the sequence signal generator 14 turns on a 16 milisecond timer 26. This timer 26 receives the clock signal F2 from a high frequency clock circuit 28 having as its output the signal F2.

Signal C simultaneously conditions up/down counter 22 to count the signal RCLK via gate 16. This will continue for period T3 determined by the frequency of signal FX.

Timer 26 continues to "time out" during this counting cycle. The function of timer 26 is to provide a time base for the accelleration measurement.

When the 16 millisecond time period has elapsed the circuit is conditioned to initiate a "down count". It will be recognized that since the rate of change requires a change in velocity per unit period of time the millisecond time period provides a time base or Δt for this computation with only a minor error caused by a small time variation between the end of the 16 millisecond "time out" and the commencement of a "down count".

Next in sequence, the signal RCLK is again counted (sequence period E) but now generator 14 causes the up/down counter 22 to count down, the counter again counting F2/N pulses from clock 28 for a period determined by FX. At the end of the second counting period, the number remaining in up/down counter 24 will be the result of an "up" count and a "down" count at a substantially fixed time interval and wherein the time period for the count for each is varied in proportion to the speed of the engine or other machine. Accordingly, the count remaining is a number proportional to the change in speed of the engine between the start of the "up" count and the "down" count and wherein the clock pulse frequency varies in proportion to the speed of the machine. This count difference will therefore represent a percent of point reading.

The accumulated count difference is next applied to a rate comparator circuit 34. The comparator 34 has a plurality of externally set inputs 35 which establish a binary coded speed change (accelleration) limit. The difference in the up/down count is compared with the preset limits and an alarm signal or other control signal is output from the comparator circuit 34 by output terminal 36 to a suitable alarm or the like in the event that the change in speed exceeds predetermined limits.

Lastly, the sequence signal generator clears the counter and performs normal housecleaning functions so the circuit may repeat its function during sequence period F.

Figure 3:
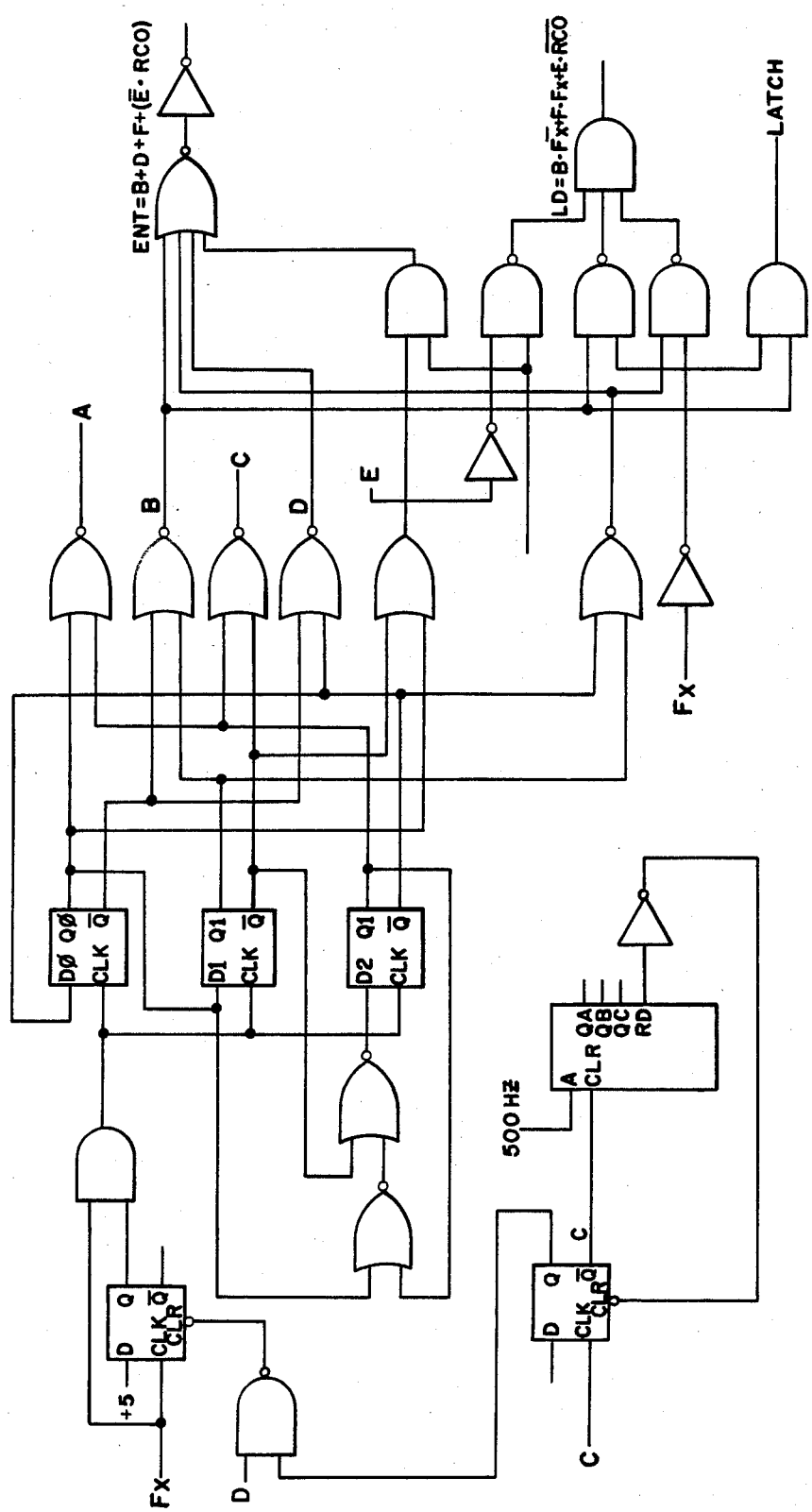
FIGS. 3 and 4 are detailed logic circuit diagrams of the detector.
Figure 4:
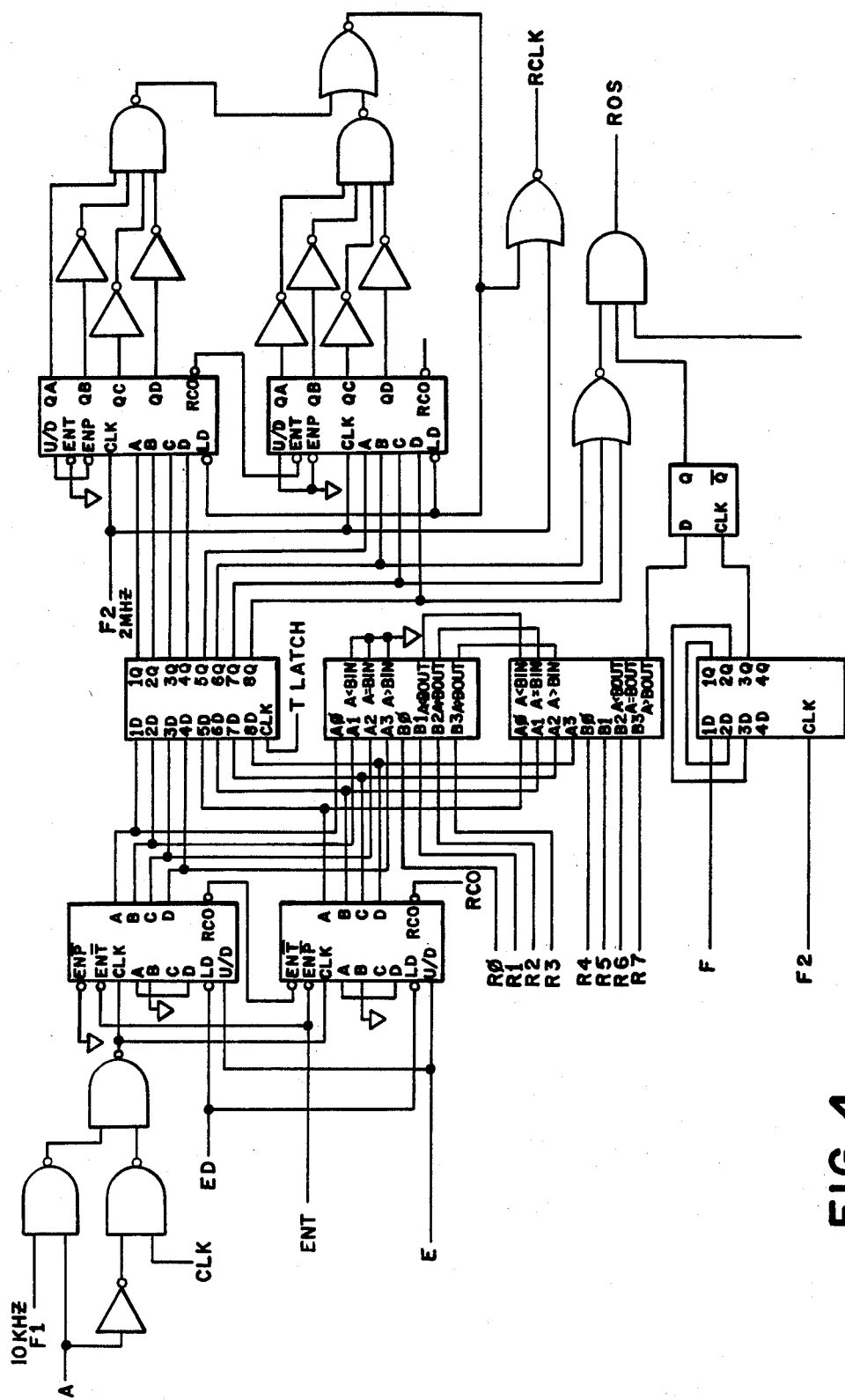

A more detailed logic diagram of the circuit is shown in FIGS. 3 and 4 wherein standard logic notation is used and the micro circuit chips are labeled.

Standard Boolean logic conditions are shown in FIG. 4, these relationships establishing the sequencing signals and related control sequence shown in FIG. 2.

In summary, it will now be seen that the present invention is a direct digital method which utilizes a variable frequency signal for an "up" count and a "down" count to establish a rate of change in speed. The change or difference is then compared to preset limits thereby providing a control signal or other indication that change in speed is within or has moved outside of predetermined limits. These limits may be preset or manually input to the comparator circuit as required. The circuit functions without the use of complex iteration methods or other complex digital manipulation and accordingly, is fast and reliable. The circuit provides an accurate per cent of point indication.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What is claimed is:

1. A device for measuring the rate of change of speed of a machine which includes means for generating a speed signal having a frequency proportional to the operating speed of the machine comprising: sequence signal generating means for generating a sequence of timing signals having time periods inversely proportional to engine speed, means for generating a variable frequency signal having a frequency proportional to the speed of said machine at the beginning of a measurement cycle, counter means connected to receive said variable frequency signal and said sequencing signals for counting the number of cycles of said variable frequency signal for a first period inversely proportionl to the speed of said machine during said counting period and for decrementing said count beginning at a predetermined interval following the beginning of said first counting period and for a second period inversely proportional to engine speed and generating an output signal corresponding to the difference therebetween, and comparator means connected to and responsive to the difference in said count for generating an output signal when said difference exceeds a predetermined maximum value.

2. The device of claim 1 wherein said sequence signal generating means includes a logic circuit connected to receive said speed signal and being responsive thereto to generate said series of sequentially occurring sequence signals.

3. The device of claim 2 wherein said means for generating a variable frequency signal includes a clock signal generator for generating a clock signal of predetermined fixed frequency and a first counter for counting the number of cycles of said first clock signal occurring during said first sequence signal.

4. The device of claim 3 wherein said variable frequency generating means furthr includes a second clock signal generating means for generating a second clock signal of predetermined fixed frequency, a digital frequency dividing circuit connected to said first counter for receiving said number of cycles of said first clock signals and to said second clock signal generating means to receive said second clock signal for dividing said number of cycles of said second clock signal occurring during the period of a second said sequencing signal by said number of cycles of said first clock signal occurring during said first period to thereby produces said variable frequency signal.

5. The device of claim 4 wherein said first counter is an up/down counter and further including a gate circuit having its input connected to receive said first clock signals and said variable frequency signal and its output connected to up/down counter, said gate circuit being responsive to said first sequence signal to input said first clock signal to said up/down counter, to said second sequence signal to count said variable frequency signal for the period of said first sequence signal and to decrement said up/down counter for the period of a subsequent sequence signal.

6. The device of claim 5 wherein said second said subsequent counting period occur at a predetermined fixed time interval.

7. The device of claim 6 wherein said first clock signal generating means includes means for dividing said second clock signal.

8. The device of claim 7 wherein said comparator means includes a digital comparator, manually operable means for inputting a digital signal to said digital comparator, said digital comparator being connected to receive said remainder and compare said remainder to said manual input digital signal.

9. A rate detecting circuit comprising first clock signal generating means for generating a clock signal of predetermned fixed frequency, speed signal generating means for generating a speed signal of frequency proportional to machine speed, sequence signal generating means for generating a predetermined series of sequentially occurring sequence control signals in response to said speed signal, the period of said sequence control signals being inversely proportional to the frequency of said speed signal, an up/down counter, gate means responsive to said sequence signals for connecting said up/down counter to said clock signal generating means to receive a fixed frequency clock signal for a first predetermined time period to generate a first count signal having a value inversely proportional to said speed signal, frequency divider circuit means responsive to said sequence control signal generating means and connected to receive said clock signal and said first count signal for generating a variable frequency signal having a frequency proportional to machine speed at the beginning of a measurement cycle, said up/down counter being responsive to predetermined other ones of said sequence control signals for counting said variable frequency signal for a first period of time proportional to machine speed and for decrementing said count in response to said variable frequency signal for a second time period proportional to machine speed.

10. The device of claim 9 wherein said counting and said decrementing time periods occur at a predetermined fixed time interval.

* * * * *